United States Patent
Biles

(10) Patent No.: US 7,831,817 B2
(45) Date of Patent: Nov. 9, 2010

(54) TWO-LEVEL BRANCH PREDICTION APPARATUS

(75) Inventor: Stuart David Biles, Cambridge (GB)

(73) Assignee: ARM Limited, Cambridge (GB)

( * ) Notice: Subject to any disclaimer, the term of this patent is extended or adjusted under 35 U.S.C. 154(b) by 1989 days.

(21) Appl. No.: 10/413,579

(22) Filed: Apr. 15, 2003

(65) Prior Publication Data

US 2004/0210749 A1    Oct. 21, 2004

(51) Int. Cl.
*G06F 9/00* (2006.01)
(52) U.S. Cl. ........................... 712/240; 712/239
(58) Field of Classification Search ................. 712/240, 712/239
See application file for complete search history.

(56) References Cited

U.S. PATENT DOCUMENTS

| | | | |
|---|---|---|---|
| 6,374,349 B1 * | 4/2002 | McFarling | 712/239 |
| 6,425,075 B1 * | 7/2002 | Stiles et al. | 712/239 |
| 6,427,192 B1 * | 7/2002 | Roberts | 711/133 |
| 6,484,256 B1 * | 11/2002 | Levitan et al. | 712/240 |
| 6,553,488 B2 * | 4/2003 | Yeh et al. | 712/239 |
| 6,678,638 B2 * | 1/2004 | Takamura | 702/186 |
| 6,766,443 B2 * | 7/2004 | Sinharoy | 712/239 |
| 6,918,033 B1 * | 7/2005 | Cho | 712/239 |
| 6,938,151 B2 * | 8/2005 | Bonanno et al. | 712/239 |
| 7,055,023 B2 * | 5/2006 | Tago et al. | 712/240 |
| 7,058,795 B2 * | 6/2006 | Kacevas et al. | 712/239 |
| 7,082,520 B2 * | 7/2006 | Bonanno et al. | 712/236 |

OTHER PUBLICATIONS

Tiamkaew, Ekkasit, Kongmunvattana, Angkul. "Techniques for Improving Branch Prediction Accuracy in YAGS Predictor." Proceeding of the ISCA 20th International Conference Computers and their Applications, 2005, pp. 174-177.*
Eden et al; "The YAGS Branch Prediction Scheme"; Department of Electrical Engineering and Computer Science, The University of Michigan; 1998.
Yeh et al; "Alternative Implementations of Two-Level Adaptive Branch Prediction"; Department of Electrical Engineering and Computer Science, The University of Michigan; pp. 124-134, May 19-21, 1992.

* cited by examiner

*Primary Examiner*—Jacob Petranek
(74) *Attorney, Agent, or Firm*—Nixon & Vanderhye P.C.

(57) ABSTRACT

A two-level branch prediction apparatus includes branch bias logic for predicting whether a branch instruction will result in a branch being taken. Upon receipt of a first address portion of a branch instruction's address, a first store outputs a corresponding first branch bias value. A history store stores history data identifying an actual branch outcome for preceding branch instructions. A second store stores multiple entries, each entry including a replacement branch bias value and a TAG value. An index derived from the history data causes the second store to output a corresponding entry. The first branch bias value is selected unless the TAG value corresponds to a comparison TAG value derived from a second address portion of the branch instruction's address, in which event, the replacement branch bias value is selected.

19 Claims, 7 Drawing Sheets

TWO-LEVEL BRANCH PREDICTION APPARATUS

BACKGROUND OF THE INVENTION

1. Field of the Invention

The present invention relates to techniques for performing branch prediction in a data processing apparatus.

2. Description of the Prior Art

A data processing apparatus will typically include one or more execution units which are operable to execute a sequence of instructions. A prefetch unit will typically be provided for prefetching instructions from a memory, for example an instruction cache, prior to those instructions being passed to the required execution unit. The prefetch unit will typically include an incrementer for incrementing a current program counter (PC) value to produce an instruction address for a next instruction or set of instructions to be prefetched. However, when a branch instruction is encountered within the instruction flow, this may cause a discontinuous jump in the PC value if the branch specified by that branch instruction is taken. As an example of such a branch instruction, a branch instruction may be used at the end of an instruction loop to indicate that the program should return to the beginning of that instruction loop if certain conditions are met (for example the required number of iterations have not been performed). Clearly, if the prefetch unit continues merely to fetch instructions based on the incremented PC value, then the execution unit will not have the required instructions once the branch instruction has been executed, and the branch has been taken.

Accordingly, it is common to provide such a prefetch unit with prediction logic aimed at predicting for a prefetched branch instruction whether the branch will be taken or not taken, and to cause the prefetch unit to prefetch further instructions based on that prediction. Such prediction as to whether a branch instruction will be taken or not taken is often referred to as "direction" prediction.

The article "The YAGS Branch Prediction Scheme" by A N Eden and T Mudge, in Proceedings of the $31^{st}$ ACM/IEEE International Symposium on Microarchitecture, pages 69-77, 1998, describes a number of known branch prediction schemes, and introduces another scheme referred to as "Yet Another Global Scheme (YAGS)". As acknowledged in the introduction of that article, a significant problem which reduces prediction rate in known global schemes is aliasing between two indices (an index is typically formed from history information and sometimes combined with certain address bits of an instruction) that map to the same entry in a Pattern History Table (PHT). The PHT will store information identifying for a particular index whether that relates to a branch instruction which should be predicted as "taken" or "not taken". Accordingly, two aliased indices that relate to two different branch instructions whose corresponding behaviour (i.e. whether they are to be predicted as taken or not taken) is the same will not result in mispredictions when referencing the PHT. This situation is defined as neutral aliasing in the article. On the other hand, two aliased indices relating to two different branch instructions with different behaviour may likely give rise to mispredictions when referencing the PHT. This situation is defined as destructive aliasing in the article. The YAGS technique is aimed at reducing the likelihood of such destructive aliasing.

FIG. 1 is a block diagram schematically illustrating the YAGS technique. History information is stored within a history buffer 30, identifying for a number of preceding branch instructions, whether those branch instructions were taken or not taken. This history information is input to index generation logic 10, which is also arranged to receive the address 20 of an instruction whose branch behaviour is to be predicted. The index generation logic 10 is arranged to perform some logical combination of the address 20 and the history information from the history buffer 30 in order to generate an index output over path 12 to the two caches 50, 60. Typically, the index generation logic is arranged to perform an "exclusive OR" function upon the input address and history information in order to generate the index output over path 12.

In addition, a portion of the address 20 is used to index the choice PHT 40 over path 42, which results in the contents of the entry identified by that index being output over path 44 to the multiplexer 90. Each entry in the choice PHT stores data indicating whether an instruction whose address portion indexes that entry should be predicted as taken or not taken. In the example illustrated in FIG. 1, this taken/not taken information takes the form of a two-bit counter (2bc).

The output from the choice PHT 40 is not only routed to the multiplexer 90, but is also input to the multiplexers 70 and 80 to control the selection of their inputs, in the manner described in more detail below.

Each of the caches 50, 60 includes a plurality of entries, with each entry containing both a TAG portion (a number of address bits) and a two-bit counter value. The cache 50 is referred to as the Taken cache, or T cache, whilst the cache 60 is referred to as the Not Taken cache or NT cache. Both the T cache 50 and the NT cache 60 are used to identify exceptions to the predictions produced by the choice PHT 40. More particularly, if the choice PHT 40 produces for a particular index a "not taken" prediction, then the T cache 50 is referenced to determine whether the actual instruction address being evaluated corresponds to a branch instruction which is an exception to that prediction, i.e. is an instruction which should be predicted as "taken". Similarly, if the choice PHT 40 outputs for a particular index a "taken" prediction, then the NT cache 60 is referenced to determine whether the instruction address being evaluated corresponds to a branch instruction which should actually be predicted as "not taken". This processing is performed as follows.

As can be seen from FIG. 1, both the T cache 50 and the NT cache 60 are referenced by the index signal output over path 12 from the index generation logic 10, this causing each cache to output the contents of the entry referenced by that index. The two-bit counter value from the indexed entry of the T cache and the two-bit counter value from the indexed entry of the NT cache are routed to multiplexer 80, whilst the TAG portion of the indexed entry of the T cache is routed to the comparison logic 55 and the TAG portion of the indexed entry of the NT cache 60 is routed to the comparison logic 65. Both the comparison logic 55 and the comparison logic 65 receive a predetermined address portion of the address 20 over path 57. Each comparison logic 55, 65 then outputs a signal to the multiplexer 70 indicative of whether there is a match between its two inputs.

Which of the two inputs to the multiplexer 70 is selected for output as a control signal to the multiplexer 90 will depend upon the output from the choice PHT 40 over path 44. Hence, as an example, if the signal output over path 44 from the choice PHT 40 indicates that the branch should be predicted as taken, then the multiplexer 70 is arranged to output as a control signal to the multiplexer 90 the signal received from the comparison logic 65, this signal indicating whether there has been a hit detected for the entry read out of the NT cache 60. Similarly, in this instance, the multiplexer 80 will output as one of the inputs to the multiplexer 90 the two-bit counter value from the entry read out of the NT cache 60. If the signal output by the multiplexer 70 indicates that there has been a hit in the NT cache, then this signal will cause the multiplexer to select as the prediction output therefrom the two-bit counter value provided from the multiplexer 80, i.e. the two-bit counter value from the relevant entry of the NT cache 60.

It can be seen that an analogous process takes place if the signal on path 44 indicates that the branch should be predicted as not taken, but this time the T cache 50 and comparison logic 55 are referenced instead of the NT cache 60 and comparison logic 65. Hence if the comparison logic 55 indicates that a hit has occurred in the T cache 50 this will cause the multiplexer 90 to output the two-bit counter value from the T cache 50 entry in preference to the signal output by the choice PHT 40.

However, in the absence of a hit in the relevant cache 50, 60, then the multiplexer 90 is arranged to output as the prediction signal the output signal from the choice PHT 40.

Hence, it can be seen that the YAGS technique stores for each branch a bias, i.e. the signal output by the choice PHT 40, and the instances when that branch does not agree with the bias, i.e. the signal output from the T cache 50 or NT cache 60 as appropriate. It has been found that the use of the T cache 50 and NT cache 60, and the TAG values stored therein (which typically will consist of a certain number of least significant bits of the branch address), reduce the above described destructive aliasing between two consecutive branches.

SUMMARY OF THE INVENTION

Viewed from a first aspect, the present invention provides branch prediction logic for generating a branch bias providing a prediction as to whether execution of a branch instruction will result in a branch being taken or not taken, the branch prediction logic comprising: a first branch bias storage operable to store for each of a plurality of first address portions a corresponding first branch bias value, the first branch bias storage being operable upon receipt of a first address portion of the branch instruction's address to output the corresponding first branch bias value from the first branch bias storage; a history storage operable to store history data identifying an outcome for a number of preceding branch instructions; a single second branch bias storage having a number of entries, each entry being operable to store a replacement branch bias value and a TAG value indicative of an instance in which the replacement branch bias value should be used as the generated branch bias in preference to the first branch bias value; index generation logic operable to generate an index identifying a corresponding entry in the single second branch bias storage, the index being derived from the history data; the single second branch bias storage being operable upon receipt of the index to cause the content of the corresponding entry to be output from the single second branch bias storage; and selection logic operable to select as the branch bias generated by the branch prediction logic the first branch bias value, unless the TAG value output from the single second branch bias storage corresponds to a comparison TAG value derived from a second address portion of the branch instruction's address, in which event, the selection logic is operable to select as the branch bias generated by the branch prediction logic the replacement branch bias value output from the single second branch bias storage.

Whilst the earlier described YAGS technique works well for implementations where significant resources can be provided for the prediction logic, for example desk-top processors, etc, the inventor of the present invention realised that certain problems arose when seeking to employ the technique in other implementations where the resources available for the prediction logic were significantly reduced, for example in mobile phones, Personal Digital Assistants (PDAs), etc. In particular, if the size available for the table and caches of the YAGS technique is relatively small, then the number of separate entries that can be provided in each cache becomes quite limited. As the number of cache entries is reduced, this means that a larger number of different branch instructions will share the same index into the cache. This gives rise to an additional type of aliasing, where two different branch instructions will result in the same index value being generated by the index generation logic 10, and hence will share the same entry in one of the caches 50, 60, but whilst both may observe the same branch behaviour, e.g. both may be predicted as taken, they have different TAG values.

With reference to FIG. 1, the following example scenario illustrates a disadvantageous result that can be obtained:

1 The index into the choice PHT 40 results in a prediction signal over path 44 indicating that the branch be predicted as taken;
2 The look-up in the NT cache 60 does not produce a hit, thereby resulting in the prediction output from the choice PHT 40 being used as the prediction output by the multiplexer 90;
3 The prediction later proves wrong, i.e. an exception to the prediction has been found, and this will result in an update process being performed to store in a particular entry of the NT cache 60 the TAG for that branch instruction, thereby replacing any TAG already at that entry;
4 If the next branch instruction shares the same index into the NT cache 60, but has a different TAG value, then if the choice PHT 40 outputs a prediction of taken, the NT cache 60 will be referenced, but again will not produce a hit in the cache;
5 Hence the "taken" prediction as output by the choice PHT 40 will be used, and if this later proves to be wrong, the entry in the NT cache 60 will be updated to reflect the TAG value for this latter branch instruction;
6 If the earlier branch instruction is then issued again, it can be seen that this process results in "thrashing" within the NT cache 60, with entries continually being updated, and a very low hit rate being achieved.

The inventor of the present invention realised that this second type of aliasing becomes a more and more significant factor as the resources available for the prediction logic are reduced, and accordingly the cache sizes are reduced.

In addition, the inventor of the present invention realised that the YAGS scheme inherently lacked flexibility, which became a significant concern in such implementations where resources for the branch prediction logic are limited. As an example, if there are a significant number of exceptions to a "not taken" bias output by the choice PHT 40, which hence need to be stored in the T cache 50, whilst there are not many exceptions to a "taken" bias output by the choice PHT 40, which results in a number of unused entries in the NT cache 60, then effective use of the overall available cache resources is not being made.

Accordingly, the present invention resides in the realisation that in such implementations the YAGS scheme provides limited flexibility, and in addition the above described second type of aliasing becomes significant. In order to alleviate these problems, branch prediction logic is provided in which a single second level branch bias storage is provided for storing replacement branch bias values and corresponding TAG values indicative of instances in which those replacement branch bias values should be used as the generated branch bias in preference to a first branch bias value produced by a first branch bias storage. Hence, in an analogous way to that described earlier with reference to the YAGS technique a first branch bias storage can be referenced to output for a particular address portion a corresponding first branch bias value. However, as a second level look-up, rather than employing the two separate caches of the YAGS technique, a single second branch bias storage is provided for storing replacement branch bias values for those instances of branch instructions whose behaviour does not agree with the first branch bias value.

This consolidation of the second level look-up resource into a single second branch bias storage improves flexibility since any of the entries can be used for an exception to either a "not taken" bias or a "taken" bias. In addition, since for a given storage budget there are now more individual entries to be indexed (of the order of twice as many as would be the case if two separate caches were provided as per the YAGS technique approach), then a finer granularity of indexes can be generated by the index generation logic, thereby reducing the likelihood of occurrence of the earlier described second type of aliasing. In addition, it should be noted that the use of the approach of the present invention enables a significant reduction in the complexity of the selection logic since there is now only a single second branch bias storage outputting an entry, rather than two different T and NT caches outputting entries.

In addition, it has surprisingly been found that, at least in implementations of the type mentioned earlier where there are reduced resources available for the prediction logic, any increase in the first type of destructive aliasing (i.e. the type of aliasing which the YAGS approach was aiming to reduce) resulting from the approach of the present invention is not significant, and is far outweighed by the benefits realised in reducing the second type of aliasing and in increasing flexibility.

It will be appreciated that the index may take a variety of forms. In one embodiment, it may be formed directly from a portion of the history data in the history storage. However, in an alternative embodiment, the index generation logic is operable to generate the index from a logical combination of the history data and the branch instruction's address.

It will be appreciated that the outcome information stored in the history register may take a variety of forms. For example, it may comprise the actual outcome information obtained following execution of each preceding branch instruction, and indicating whether those branch instructions were actually taken or not taken. Alternatively, the outcome for at least some of the preceding branch instructions may comprise speculative outcome information based on the predictions made for those preceding branch instructions. Typically, when those preceding branch instructions are subsequently executed, the actual outcome information will be used to confirm the speculative outcome information in the history register, or in the event of a misprediction the actual outcome information is used to correct the history data in the history storage.

It will be appreciated that the TAG value can take a variety of forms. In one embodiment, the TAG value is a second address portion, and the comparison TAG value is the second address portion of the branch instruction's address. However, in an alternative embodiment, the TAG value within each entry of the exception cache may comprise further data in addition to the second address portion. For example, it could in one embodiment also include some extended history register information.

It will be appreciated that the single second branch bias storage can take a variety of forms. However, in one embodiment, the single second branch bias storage is a set associative storage, wherein the index identifies multiple corresponding entries in the single second branch bias storage, the selection logic being operable to determine whether any of the TAG values output from the corresponding entries correspond to the comparison TAG value, and in the event of such correspondence with the TAG value of one of said corresponding entries, to select the replacement branch bias value for that one corresponding entry as the branch bias generated by the branch prediction logic. Use of a set associative storage further reduces aliasing issues, by enabling more than one entry to be provided for any particular index generated by the index generation logic.

In one embodiment, the multiple entries provided for a particular index will not have the same TAG value and hence the selection logic will not need to provide for situations where more than one of the TAG values output from the single second branch bias storage match the comparison TAG value. In such situations, the selection logic may include a simple priority encoder to determine which replacement bias value to output dependent on which, if any, of the TAG values output from the single second branch bias storage match the comparison TAG value.

However, an alternative embodiment using such a set associative storage may be arranged such that more than one of the TAG values output from the single second branch bias storage match the comparison TAG value. In such an embodiment, the selection logic may further comprise a priority encoder operable, in the event that the selection logic determines correspondence with the TAG value from more than one of said corresponding entries, to perform a predetermined prioritisation routine to determine which of those corresponding entries' replacement branch bias value is to be selected as the branch bias generated by the branch prediction logic.

A number of predetermined prioritisation routines may be used. For example, each entry in the single second branch bias storage may have an extended TAG portion storing the above-mentioned TAG value and some additional TAG data. The additional TAG data may be some history data, in which event the predetermined prioritisation routine may involve that history data from each of the matching entries being compared against some additional history data held in the history storage but not used in the generation of the index. Alternatively, the additional TAG data may comprises certain address data, in which event the predetermined prioritisation routine may involve that address data from each of the matching entries being compared against some additional address bits of the branch instruction's address that were not used in the generation of the index.

As another example, each entry in the single second branch bias storage may be arranged to have a further field which holds a value indicating which of the multiple corresponding entries for a particular index was most recently correct, i.e. most recently provided a replacement branch bias value for a branch instruction that correctly predicted the branch behaviour of that branch instruction. In such an embodiment the predetermined prioritisation routine may involve referring to the further field in each of the matching entries in order to determine which entry was most recently correct, such that the selection logic is then arranged to select as the branch bias the replacement branch bias value output by the most recently correct entry.

In one embodiment, the data processing apparatus further comprises update logic operable to update the history data in the history storage to take account of whether execution of the branch instruction results in a branch being taken or not taken. In one embodiment, this is done using outcome data returned to the history data reflecting the actual outcome of execution of each branch instruction. In one particular embodiment, the history storage takes the form of a shift register, with each bit in the shift register being used to store the outcome of one previous branch instruction, i.e. whether that branch instruction was taken or not taken. As each new history bit is shifted into the register at one end, the oldest history bit in the shift register is shifted out of the other end to make room for the new entry. At any particular instance in time, the contents of the shift register, or some portion of it, provide the history data used by the index generation logic. This approach has been found to be a particularly efficient way of storing history data for a predetermined number of preceding branch instructions.

Whilst the history register can be updated following execution of the branch instruction using the actual outcome data, it may alternatively be updated speculatively with the predicted results of branch instructions. This allows multiple branch predictions to be performed in quick succession using the speculated state for predicting the later branch instructions, thereby ensuring that the most up-to-date history data is used for each prediction, assuming that the earlier branch instructions were predicted correctly. Such an approach for updating a history register is mentioned in the article "Alternative Implementations of Two-Level Adaptive Branch Prediction" by T Yeh and Y N Patt, the 19$^{th}$ Annual International Symposium on Computer Architecture, pages 124-134, 1992. When each predicted branch instruction is subsequently executed, the speculative update to the history register is confirmed in the event that the prediction was correct. In the event that the prediction is determined to be incorrect, logic can be provided to "unwind" the speculative updates to the history register.

In one embodiment, the data processing apparatus further comprises update logic operable, following subsequent execution of the branch instruction, to update within the first branch bias storage the first branch bias value associated with the first address portion of the branch instruction so as to take account of whether the execution of the branch instruction resulted in a branch being taken or not taken, unless one of said replacement branch bias values was used as the generated branch bias, that replacement branch bias value correctly predicted the branch, and the first branch bias value would have incorrectly predicted the branch, in which event no update of the first branch bias value is performed. The purpose of the replacement branch bias values is to correctly predict those branch instructions which are an exception to the bias that is output by the first branch bias storage. Accordingly, if one of the replacement branch bias values was used as the generated branch bias and that replacement branch bias value correctly predicted the branch, then no update is required to the first branch bias value if the first branch bias value would have incorrectly predicted the branch. However, unless this particular situation exists, then the first branch bias value should be updated to take account of the outcome of the branch instruction.

In one embodiment, the first branch bias value consists of a two-bit counter value, which can be used to encode whether the branch instruction should be predicted as strongly not taken, weakly not taken, weakly taken or strongly taken. Typically, from the point of view of the prefetch unit prefetching instructions, it is solely concerned with whether the branch had been predicted as taken or not taken. However, the above encoding ensures that the behaviour of branch instructions with a particular first address portion is not automatically changed from taken to not-taken, or vice versa, based solely on the outcome of the previous issuance of a branch instruction corresponding to that first address portion. As an example, if the two-bit counter value identifies that the branch instruction should be predicted as strongly taken, and it later transpires that the branch was not taken (and that exception was not correctly predicted by one of the replacement branch bias values), then the first branch bias value may be updated to show that branch instructions having that particular first address portion should now be predicted as weakly taken. Hence, by this approach, the fact that the last occurrence resulted in the branch being "not taken" has been taken into account without immediately changing the prediction from "taken" to "not taken". If the next occurrence of an instruction with that first address portion also results in the branch being not taken (and that exceptional behaviour was not predicted correctly by a replacement branch bias value), then the first bias value may be updated to show that branch instructions with that first address portion should now be predicted as weakly not taken. It will be appreciated by those skilled in the art that the above is just one example of how the two-bit counter value may be updated and used, and that there are many well documented two bit or n bit prediction schemes that could be used.

In one embodiment of the present invention, the data processing apparatus further comprises update logic operable, following subsequent execution of the branch instruction, and if one of said replacement branch bias values was used as the generated branch bias, to update that replacement branch bias value within the corresponding entry of the single second branch bias storage so as to take account of whether the execution of the branch instruction resulted in a branch being taken or not taken.

In one embodiment, the replacement branch bias values are of the same form as the first branch bias values, and in particular are provided by two-bit counters that can encode whether the branch instruction should be predicted as strongly not taken, weakly not taken, weakly taken or strongly taken.

It will be appreciated that the first branch bias storage can take a variety of forms. However, in one embodiment, the first branch bias storage is a table which, based on a received index, will output a corresponding first branch bias value.

It will also be appreciated that the single second branch bias storage can take a variety of forms. However, in one embodiment, the single second branch bias storage is a single cache, which is responsive to a particular index to output a replacement branch bias value and a TAG value contained within an entry corresponding to that index.

Viewed from a second aspect, the present invention provides a data processing apparatus comprising: an execution unit operable to execute a sequence of instructions; and a prefetch unit operable to prefetch instructions from a memory for passing to the execution unit; the prefetch unit including branch prediction logic operable to generate a branch bias providing a prediction as to whether execution of a branch instruction by the execution unit will result in a branch being taken or not taken; the branch prediction logic comprising: a first branch bias storage operable to store for each of a plurality of first address portions a corresponding first branch bias value, the first branch bias storage being operable upon receipt of a first address portion of the branch instruction's address to output the corresponding first branch bias value from the first branch bias storage; a history storage operable to store history data identifying an outcome for a number of preceding branch instructions; a single second branch bias storage having a number of entries, each entry being operable to store a replacement branch bias value and a TAG value indicative of an instance in which the replacement branch bias value should be used as the generated branch bias in preference to the first branch bias value; index generation logic operable to generate an index identifying a corresponding entry in the single second branch bias storage, the index being derived from the history data; the single second branch bias storage being operable upon receipt of the index to cause the content of the corresponding entry to be output from the single second branch bias storage; and selection logic operable to select as the branch bias generated by the branch prediction logic the first branch bias value, unless the TAG value output from the single second branch bias storage corresponds to a comparison TAG value derived from a second address portion of the branch instruction's address, in which event, the selection logic is operable to select as the branch bias generated by the branch prediction logic the replacement branch bias value output from the single second branch bias storage.

Viewed from a third aspect, the present invention provides a method of generating within a data processing apparatus a branch bias providing a prediction as to whether execution of a branch instruction will result in a branch being taken or not taken, the method comprising the steps of: referencing a first branch bias storage using a first address portion of the branch instruction's address, the first branch bias storage being operable to store for each of a plurality of first address portions a corresponding first branch bias value, and being responsive to said referencing to output the first branch bias value corresponding to the first address portion of the branch instruction's address; storing history data identifying an outcome for a number of preceding branch instructions; generating an index identifying a corresponding entry in a single second branch bias storage, the index being derived from the history data, the single second branch bias storage having a number of entries, each entry being operable to store a replacement branch bias value and a TAG value indicative of an instance in which the replacement branch bias value should be used as the generated branch bias in preference to the first branch bias value; referencing the single second branch bias storage using the index to cause the content of the corresponding entry to be output from the single second branch bias storage; and selecting as the generated branch bias the first branch bias value, unless the TAG value output from the single second branch bias storage corresponds to a comparison TAG value derived from a second address portion of the branch instruction's address, in which event, selecting as the generated branch bias the replacement branch bias value output from the single second branch bias storage.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
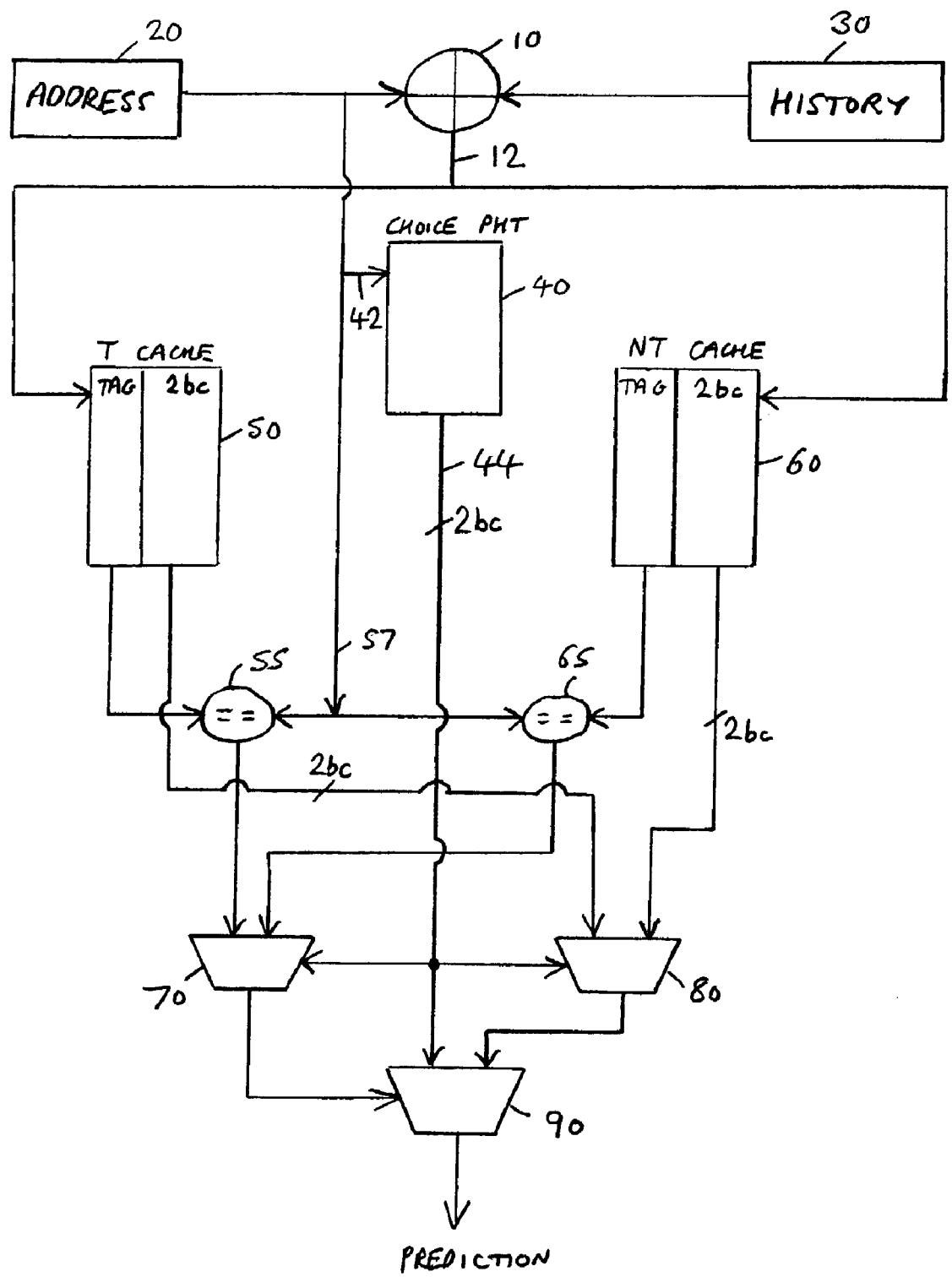
FIG. 1 is a block diagram schematically illustrating a prior art YAGS technique for performing branch prediction.
Figure 2A:
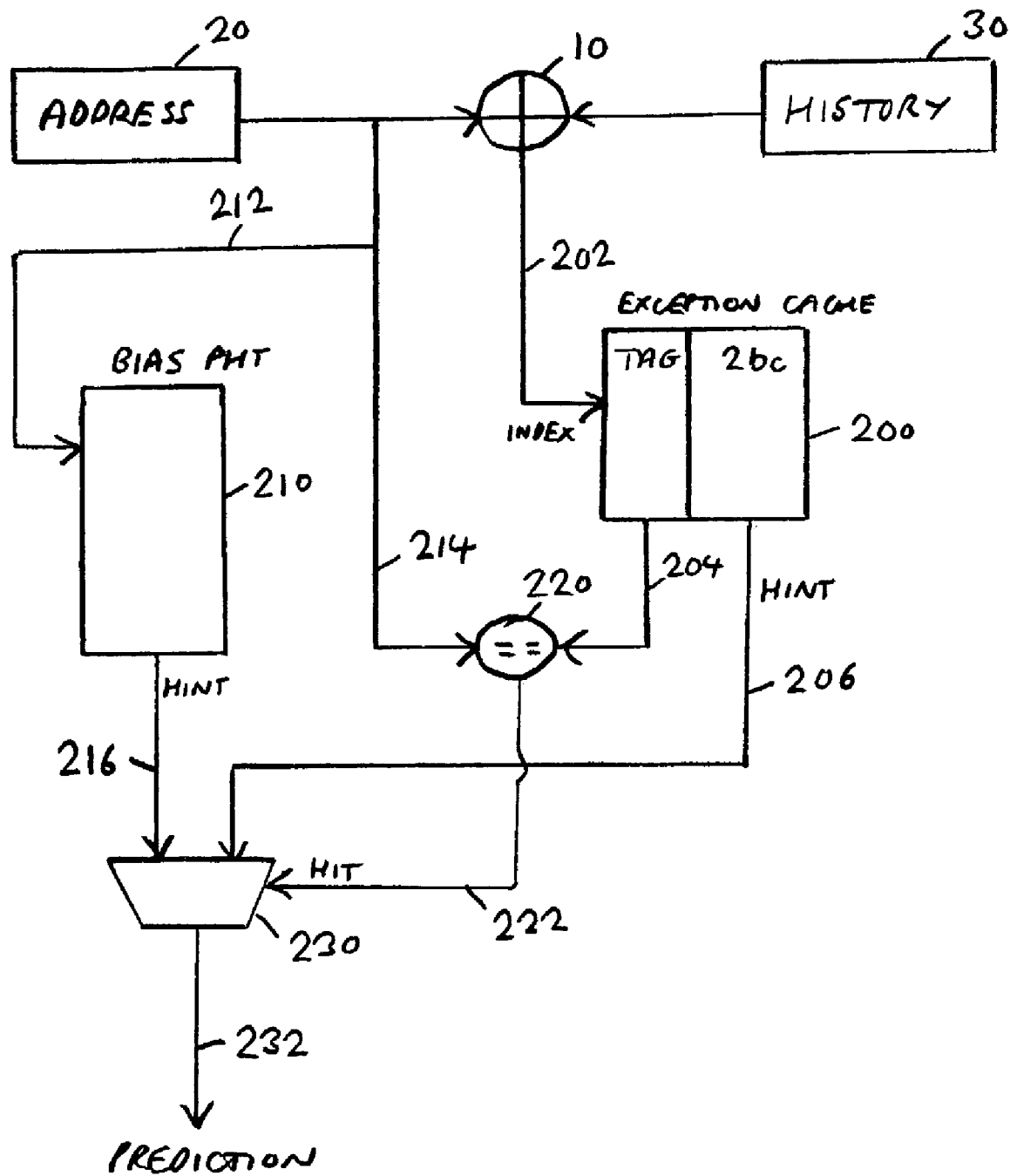
FIG. 2A is a block diagram schematically illustrating a first embodiment of the present invention for performing branch prediction.

FIG. 2A is a block diagram illustrating a branch prediction scheme in accordance with one embodiment of the present invention. In a similar manner to that described earlier with reference to the YAGS prediction scheme, index generation logic 10 is operable to receive both an address 20 for an instruction to be evaluated, and history data from a history register 30 identifying for a number of preceding branch instructions whether those branch instructions were taken or not taken. The index generation logic 10 is operable to generate, from a logical combination of the history data and the branch instruction's address, an index output over path 202 to a single exception cache 200. In alternative embodiments, it will be appreciated that the index generation logic may be arranged to generate an index based solely on the history data.

Additionally, a first portion of the instruction address 20 is routed over path 212 to act as an index into a bias PHT 210. The bias PHT 210 is arranged to store for each of a plurality of first address portions a corresponding first branch bias value, also referred to herein as a first hint value. The exception cache 200 is then used to identify branch instructions whose corresponding first address portion will result in an incorrect first hint value being output from the bias PHT 210.

Hence, as an example, if a particular branch instruction should be predicted as taken, but its corresponding first address portion will cause a first hint value to be output from the bias PHT 210 indicating a not taken prediction, then an entry for that branch instruction can be made within the exception cache 200. Each entry in the exception cache 200 will consist of a TAG portion, and a two-bit counter value specifying a replacement branch bias value, also referred to herein as a replacement hint value. In one embodiment, the TAG portion is arranged to store a second address portion of the branch instruction address associated with that entry. In an alternative embodiment, the TAG portion may additionally store further data, for example some history data. For the purpose of the following embodiment description, it will be assume that the TAG portion contains solely a second address portion.

Similarly, if a particular branch instruction should be predicted as not taken, but its corresponding first address portion will cause the bias PHT 210 to output a first hint value indicating that the branch instruction should be predicted as taken, then an entry can be made for that branch instruction in the same single exception cache 200 to store a TAG portion corresponding to a second address portion of that branch instruction, and a two-bit counter value specifying that that particular instruction should be predicted as not taken.

Comparison logic 220 is provided for comparing a second address portion of the address 20 received over path 214 with the TAG portion read out from the indexed entry of the exception cache over path 204, and to generate a hit signal over path 222 indicative of the comparison, this hit signal being used to control the multiplexer 230. The replacement hint value for the indexed entry of the exception cache 200 is output over path 206 to a second input of the multiplexer 230, the first input of that multiplexer having received the first hint value output from the bias PHT 210. In the event that the hit signal over path 222 indicates that a match has been found between the second address portion of the address 20 and the TAG portion of the indexed entry of the exception cache 200, then the multiplexer 230 is arranged to output as the prediction over path 232 the replacement hint value received from the exception cache over path 206. However, if the hit signal is not set to indicate such a match, then the multiplexer 230 will instead output as the prediction over path 232 the first hint value received over path 216 from the bias PHT 210.

Figure 6:
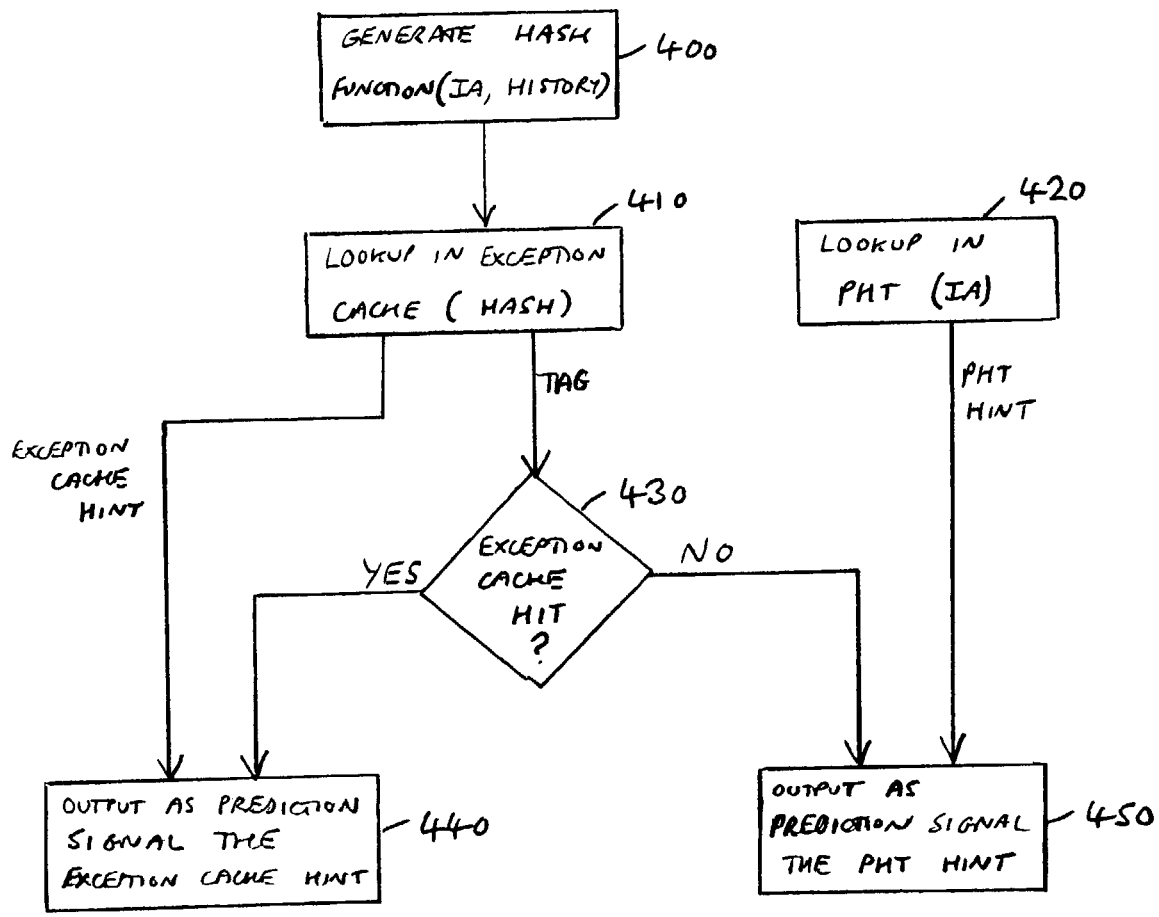
FIG. 6 is a flow diagram illustrating the operation of the branch prediction logic illustrated in FIG. 2A.

FIG. 6 is a flow diagram illustrating the general operation of the logic of FIG. 2A. As can be seen from FIG. 6, at step 400 a hash function or index is generated from a logical combination of the instruction address 20 and the history data from the history register 30, this operation being performed by the index generation logic 10. In one embodiment, this logical combination is an "exclusive OR" operation. Then, at step 410 a look-up is performed in the exception cache in order to output the contents of the entry identified by the index.

Meanwhile, a look-up is also performed at step 420 in the bias PHT 210 based on a first portion of the instruction address, resulting in the output of a first hint signal from the bias PHT 210.

The TAG value output from the indexed entry of the exception cache is compared at step 430 with a second portion of the instruction address in order to determine whether there has been a hit in the exception cache. Typically, the second address portion used at step 430 may differ to the first address portion used at step 420 as the index into the bias PHT, although this is not essential. Whilst the first and second address portions might typically be different, it will be appreciated that they may overlap.

In an alternative embodiment, the TAG portion within each entry of the exception cache may comprise further data in addition to the second address portion. For example, it could in one embodiment also include some extended history register information. In such cases, it is possible to arrange for the entirety of the TAG portion to be output from the indexed entry of the exception cache, and for the comparison performed at step 430 to take into account this further data.

If an exception cache hit is detected at step 430, the process branches to step 440, where the exception cache hint output from the exception cache is used as the prediction signal output over path 232. If, however, at step 430 it is determined that there is no exception cache hit, then the process proceeds to step 450, where the hint signal from the bias PHT 210 is instead used as the prediction signal output over path 232.

Figure 3:
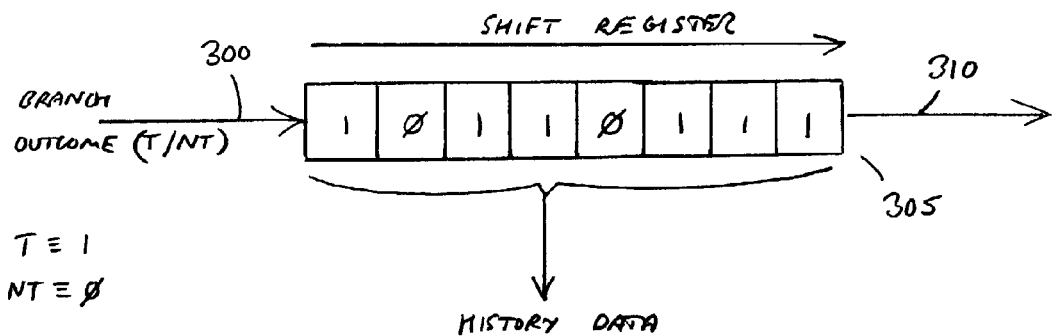
FIG. 3 illustrates the operation of the history register in one embodiment of the present invention.

FIG. 3 illustrates the content of the history register 30 used in embodiments of the present invention to store the history data. The history register may be formed from a shift register 305 consisting of a predetermined number of bits. In the FIG. 3 example, the shift register is shown as having eight bits, but it will be appreciated that more or less bits may be provided within the shift register dependent on the amount of history data that it is desired to maintain. When a branch instruction is executed, and its outcome is determined (i.e. it is determined whether the branch was taken or not taken), that information is fed back to the history register over path 300 as a branch outcome signal. In the embodiment illustrated in FIG. 3 a single bit is specified to identify whether the branch was taken or not taken, and in the particular example in FIG. 3, if the branch was taken this is indicated by setting the branch outcome signal to a logic one value, whereas if the branch was not taken, this is indicated by setting the branch outcome signal to a logic zero value. As each branch outcome bit enters the shift register over path 300, the bits of information already in the shift register are shifted one place to the right, which results in the oldest item of history data being discarded from the shift register over path 310. At any instance in time, the history data used by the index generation logic 10 consists of the content of the shift register 305 or some portion of it. Hence, with reference to the particular example of FIG. 3, it can be seen that the history data will consist of an eight bit value representative of the outcome of the last eight branch instructions.

Although FIG. 3 shows the history register 30 being updated based on the actual branch outcome, it is also possible as mentioned earlier to speculatively update the history register based on the predicted outcome of branch instructions. In a pipelined implementation of a data processing apparatus, it has been found that such an approach may be beneficial in maintaining the accuracy of prediction. When each predicted branch instruction is subsequently executed, the speculative update to the history register is confirmed in the event that the prediction was correct. In the event that the prediction is determined to be incorrect, logic can be provided to "unwind" the speculative updates to the history register.

There are a number of ways in which the history register can be arranged to provide this functionality. In one embodiment, the history register is formed by two shift registers, one being used to store the actual outcome information (hereafter called the "real" shift register), and one being used to stored speculated outcome information (hereafter called the "speculated" shift register. The speculated shift register is used for outputting history data to the index generation logic, and in the event that a misprediction occurs, the "unwinding" process is performed by copying the content of the real shift register to the speculated shift register to correct the history data contained within the speculated shift register.

In an alternative embodiment, a single shift register is used, but it is chosen to have a length greater than that required to hold the history data used by the index generation logic. Speculated outcome information is fed into the shift register at one end (e.g. bit 0), causing each bit in the register to be shifted in a first direction, and the first m bits are used in each prediction (i.e. bits 0 to m−1 are output to the index generation logic). Due to the length of the shift register being greater than m, history data is not immediately lost when it moves from bit position m−1 to a higher bit position. Hence, in the event of a misprediction for a particular branch instruction, the shift register can be unwound by shifting the bits back in a direction opposite to the first direction in order to remove the incorrect speculated outcome information for that branch instruction and any subsequently issued branch instruction. This results in some of the earlier history data evicted from the first m bits being returned into bits positions within the first m bits in order to form the corrected history data.

A further alternative to the above two approaches is to provide a single shift register and merely re-initialise it in the event of a misprediction. This may be satisfactory in situations where low cost implementation is a priority and/or the length of the history register is short (and hence it will "retrain" quickly), particularly if the prediction accuracy in the target application turns out to be high, thereby resulting in few mispredictions and hence few retraining occurrences.

Figure 4:
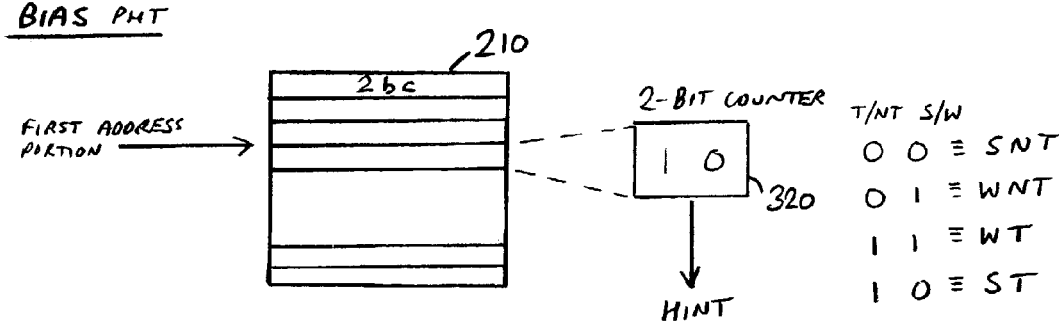
FIG. 4 illustrates the format of the bias PHT of embodiments of the present invention.

FIG. 4 is a diagram schematically illustrating the format of the bias PHT 210 used in embodiments of the present invention. As can be seen from FIG. 4, the bias PHT 210 consists of a number of entries, each entry storing a two-bit counter value 320 identifying a first hint value. When a first portion of an instruction address is passed to the bias PHT 210, that first address portion is used as an index to identify a particular entry in the bias PHT 210, whose content is then output as the first hint value. As can be seen from FIG. 4, the least significant bit of the two-bit counter is used to specify a "strong" or "weak" attribute, whilst the most significant bit is used to specify a "taken" or "not taken" attribute. Hence, as an example if the two-bit counter value is "10", this corresponds to a first hint value of "strongly taken", whilst if the two-bit counter value is "01", this corresponds to a first hint value of "weakly not taken". It will be appreciated by those skilled in the art that the values associated with the logic one and logic zero values could be swapped to provide different encodings for the values strongly not taken, weakly not taken, weakly taken or strongly taken.

Figure 5:
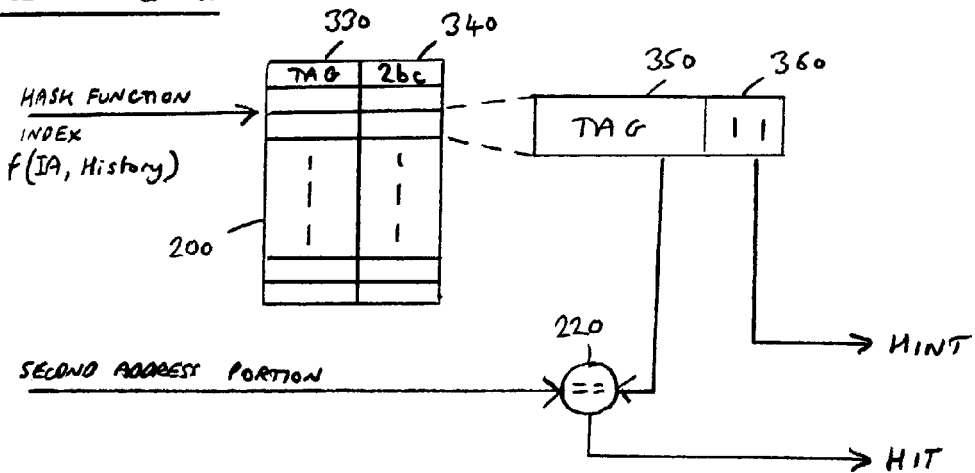
FIG. 5 illustrates the format of the exception cache of embodiments of the present invention, and the use of both the TAG portion and the two-bit counter portion.

FIG. 5 illustrates a format of the exception cache 200. This cache consists of a number of entries, with each entry including a TAG portion 330 and a two-bit counter value 340. When the hash function index generated by the index generation logic 10 is used to index the exception cache 200, this will identify a particular entry whose contents are then output. In the example illustrated in FIG. 5, this entry consists of a TAG portion 350 and a two-bit counter value 360. The TAG value 350 is input to the comparison logic 220, where it is compared with a second address portion of the instruction address in order to generate a hit signal indicating whether a match has been detected, whilst the two-bit counter value 360 is output as the replacement hint value to the multiplexer 230 (see FIG. 2A).

Figure 2B:
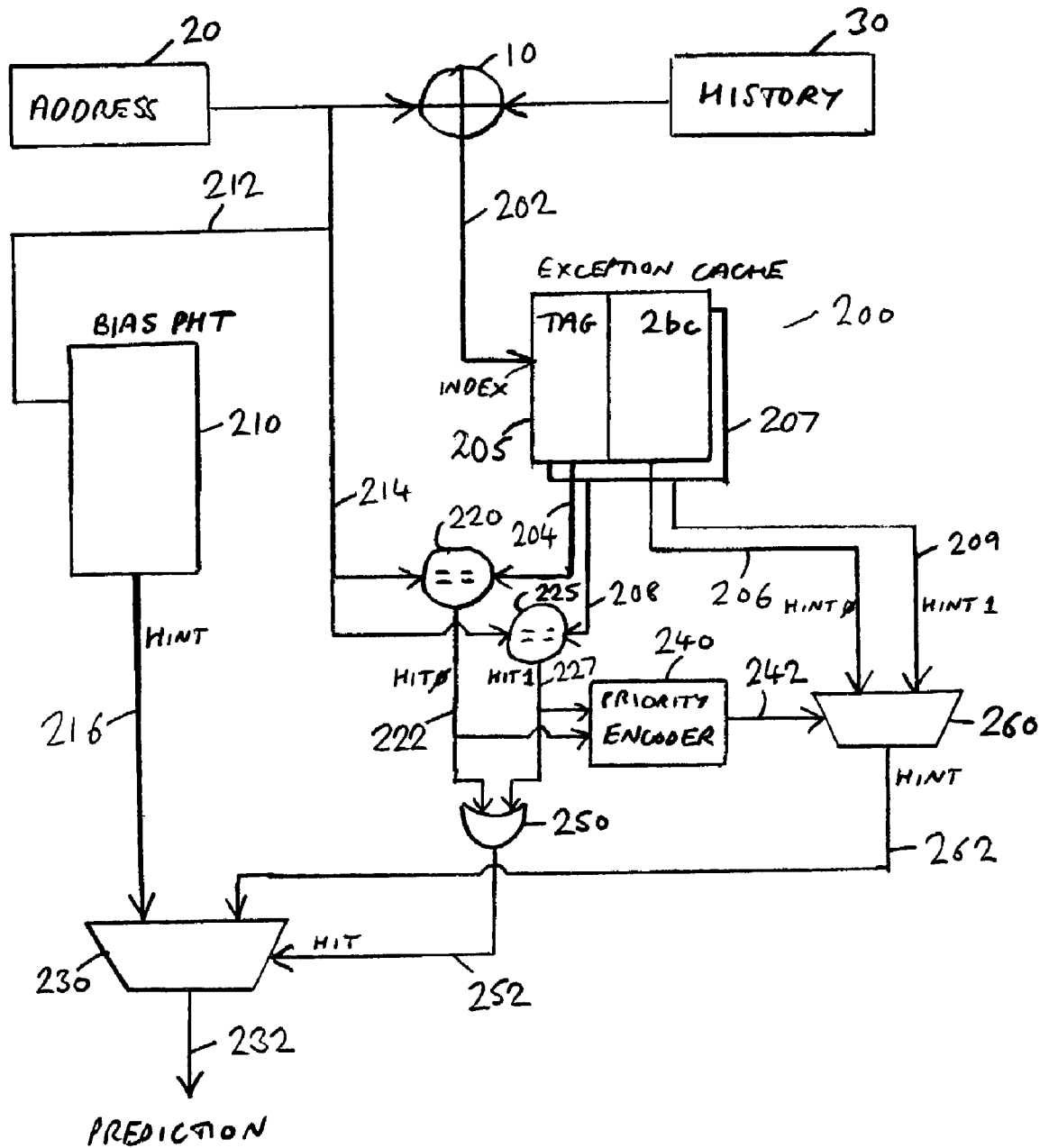
FIG. 2B is a block diagram schematically illustrating a second embodiment of the present invention for performing branch prediction.

FIG. 2B is a block diagram illustrating an alternative embodiment to the present invention, in which a set associative cache is used as the exception cache. In particular, as shown in FIG. 2B, a two-way set associative cache 200 is shown. The index generated over path 202 from the index generation logic 10 will now cause an entry in the first way 205 and an entry in the second way 207 to be output from the exception cache 200. The two TAG values output from these entries will be passed over paths 204, 208 to comparison logic 220, 225, respectively, where they will be compared with the second address portion received over path 214. This results in the generation of two hit signals output over paths 222, 227 to an OR gate 250, whose output is then used to generate a hit signal over path 252 used to control the multiplexer 230.

These hit signals are also routed to a priority encoder 240 used to control the selection of the replacement hint values received by the multiplexer 260 over paths 206, 209 from cache ways 205, 207. In one embodiment, the two entries provided for a particular index will not have the same TAG value and hence the comparison logic 220, 225 will not both generate set hit signals at the same time. In such situations, the priority encoder can be arranged to be hard-wired to perform a simple priority encoding in order to generate a drive signal over path 242 to the multiplexer 260. For example, the following encoding could be performed by the priority encoder 240:

TABLE 1

| Hit 0 | Hit 1 | Drive signal on path 242 |
|---|---|---|
| 0 | 0 | X |
| 1 | 0 | 0 |
| 0 | 1 | 1 |
| 1 | 1 | X |

In Table 1 above, a "0" indicates an "unset" state, a "1" indicates a "set" state, and an "X" signifies a "don't care" state. As can be seen from Table 1, if neither hit signal is set, then it does not matter which hint value is output by the multiplexer 260 as that output will not be selected by the multiplexer 230 in any event. If one of the two hit signals is set, then a corresponding drive signal can be output by the priority encoder to cause the appropriate hint value to be selected. In the above example, a drive signal of "0" will cause the hint 0 value over path 206 to be selected by the multiplexer 260, whilst a drive signal of "1" will cause the hint 1 value over path 209 to be selected by the multiplexer 260.

As mentioned earlier, in this embodiment, the two entries provided for a particular index will not have the same TAG value and hence the comparison logic 220, 225 should not both generate set hit signals at the same time. Accordingly, in the event that two set hit signals are received, a "don't care" state is determined, and hence depending on the hardware used within the priority encoder the drive signal will be a "0" or a "1". This will in effect mean that priority is given to one of the hint values in that situation, but since this situation is expected not to happen, such an approach is acceptable.

In an alternative embodiment, the prediction logic may be arranged such that two entries with the same TAG values can be provided for a particular index. In such embodiments, the priority encoder may be arranged to perform a predetermined prioritisation routine to determine, in the event that both of the hit signals indicate that a match has been found, which cache way's hint value should be used as the replacement hint value. It will be appreciated that the priority encoder 240 could be arranged to apply any suitable prioritisation scheme. For example, each entry in the exception cache 200 may have an extended TAG portion storing the above-mentioned TAG values output over paths 204, 208, and some additional TAG data. The additional TAG data may be some history data, in which event the predetermined prioritisation routine may involve that history data from both of the matching entries being compared against some additional history data held in the history storage 30 but not necessarily used in the generation of the index by the index generation logic 10. Alternatively, the additional TAG data may comprises certain address data, in which event the predetermined prioritisation routine may involve that address data from both of the matching entries being compared against some additional address bits of the branch instruction's address 20 that were not necessarily used in the generation of the index.

The result of performing the predetermined prioritisation routine will be that the priority encoder will select one of the hint values for selection and produce the appropriate drive signal to cause that hint value to be selected by the multiplexer 260.

The output from the multiplexer 260 is routed over path 262 to the second input of the multiplexer 230. The output from the OR gate 250 is then used to determine which of the two inputs received by the multiplexer 230 are output as the prediction signal over path 232. Accordingly, it can be seen that if no set hit signals are generated by either of the comparison logic units 220, 225, then the multiplexer 230 will be arranged to output the first hint value received over path 216 from the bias PHT 210. However, if at least one of the comparison logic units 220, 225 generates a set hit signal, this will cause the multiplexer 230 to select as its output the replacement hint value received over path 262 from the multiplexer 260.

Figure 7:
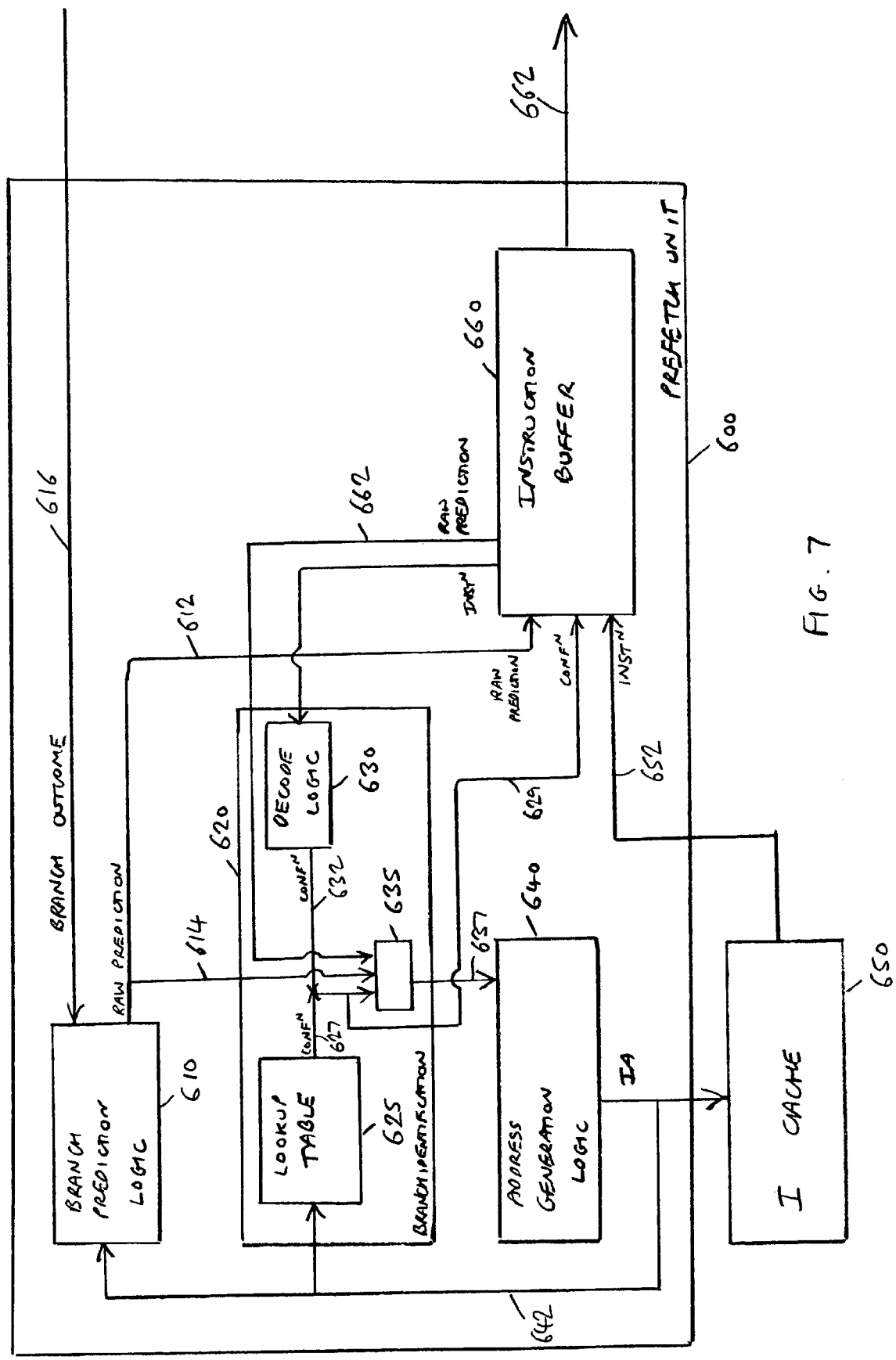
FIG. 7 is a block diagram illustrating the relevant components provided within a prefetch unit in accordance with one embodiment of the present invention.

FIG. 7 is a block diagram illustrating the relevant components provided within a prefetch unit 600 in accordance with one embodiment of the present invention. Address generation logic 640 within the prefetch unit 600 is arranged to generate instruction addresses for outputting to an instruction cache 650 to cause the instructions at those addresses to be prefetched and routed over path 652 into the instruction buffer 660, prior to them being output over path 662 to the required execution unit for execution.

As each instruction address is generated by the address generation logic 640, it is routed over path 642 to the branch prediction logic 610, which will include branch prediction circuitry in accordance with embodiments of the present invention. Hence, as an example, the branch prediction logic 610 may include the logic of FIG. 2A or the logic of FIG. 2B. The operation of the branch prediction logic 610 results in the generation of a raw prediction signal which is routed over path 612 to the instruction buffer for storage in association with the corresponding instruction retrieved over path 652. The raw prediction signal is also routed over path 614 to some control logic 635 within branch identification logic 620.

The branch identification logic 620 is arranged to receive via path 642 the instruction address issued by the address generation logic 640 and performs a look-up in a look-up table 625 to determine whether that instruction address corresponds to a branch instruction that has previously been encountered and hence identified in the look-up table. The format of such look-up tables will be well known to those skilled in the art, and hence will not be discussed in any further detail herein. It will be appreciated that a branch target cache or branch target address cache could be used to perform a similar function to the look-up table 625. In the event that the look-up in the look-up table 625 indicates that the instruction is indeed a branch instruction, this will be identified by a confirmation signal routed via path 627 to the control logic 635, and also passed over path 629 to the instruction buffer 660, where it will be stored in association with the corresponding instruction received over path 652.

If the confirmation signal issued over path 627 indicates that the instruction is a branch instruction, then the control logic 635 will be arranged to output over path 637 the prediction information within the raw prediction signal received over path 614, to identify to the address generation logic 640 whether or not the branch is to be predicted as taken. As will be appreciated by those skilled in the art, this information can then be used by the address generation logic 640 in order to determine which instruction address to issue next to the instruction cache 650. As an example, if the branch instruction is a direct branch instruction which specifies as an operand of the instruction the target address to be used in the event that the branch is taken, and the raw prediction signal output by the branch prediction logic indicates that the branch should be predicted as taken, this target address can be used by the address generation logic 640 as the next instruction address. Similarly, if for the same instruction, the branch prediction logic 610 indicates that the branch should not be taken, then the address generation logic will merely generate an incremented version of the current program counter value as the next instruction address to be issued to the instruction cache 650.

Whilst the look-up table 625 can be used to give an indication as to whether the instruction being prefetched is a branch instruction, the look-up table will not necessarily contain all such branch instructions, and hence may not identify a branch instruction in all instances. Accordingly, in one embodiment, the branch identification logic 620 further includes decode logic 630 which is arranged to perform some preliminary decode of instructions in the instruction buffer 660. In particular, the decode logic 630 will decode as much as required of the instruction in order to determine whether it is a branch instruction, and will then output a confirmation signal over path 632 for routing to the control logic 635. That confirmation signal will also be routed via path 629 to the instruction buffer 660 for storing in association with the instruction. In association with the confirmation signal received by the control logic 635 from the decode logic 630 the control logic 635 will also receive the raw prediction signal over path 662 from the instruction buffer, and in the event that the confirmation signal indicates that the instruction is a branch instruction, will cause that prediction information to be output over path 637 to the address generation logic 640. In the event that, via the decode logic 630, an instruction already in the instruction buffer 660 is detected as a branch instruction, and its associated prediction information indicates that that branch will be taken, the address generation logic 640 will generate as a next instruction address the target address for that branch instruction. If any intervening instructions have been prefetched, those instructions will typically be removed from the instruction buffer 660.

It will be appreciated that there is no requirement for the prefetch unit 600 to include both the look-up table 625 and the decode logic 630, and in alternative embodiments only one of these approaches for identifying branch instructions may be provided.

As each instruction reaches the front of the instruction buffer 660, it will be output over path 662 along with the corresponding raw prediction information and confirmation signal identifying whether the instruction is in fact a branch instruction. This information is used later when the branch instruction is executed by the execution unit in order to determine for recovery purposes whether the prediction was correct, and also to generate branch outcome information for returning to the branch prediction logic 610 over path 616, as will now be discussed in more detail with reference to the flow diagram of FIG. 8.

In the embodiment described with reference to FIG. 7, the raw prediction information stored in the instruction buffer 660 consists of the following information:

The taken/not taken prediction produced by both the bias PHT 210 and the exception cache 200.

An indication of whether a hit was generated in the exception cache (and in the event of a set associative cache, which way the hit was generated in).

The index "idx" use to index the bias PHT (i.e. the first address portion).

The index ("Hash") used to index the exception cache.

The second address portion (which is used to write the TAG portion when allocating an entry).

When an instruction is subsequently executed by the relevant execution unit, this will result in the generation of branch outcome information returned over path 616 to the branch prediction logic 610, and used by the branch prediction logic 610 to determine whether any updates are required to the history register 30, the bias PHT 210 or the exception cache 200. In the embodiment described with reference to FIG. 8, the branch outcome information returned over path 616 includes the following information:

An outcome signal identifying the outcome of the branch instruction, i.e. whether it was in fact taken or not taken.

The original prediction information generated by the bias PHT 210 and the exception cache 200.

An indication as to whether an exception cache hit occurred at the time the prediction took place (and in the event of a set associative cache, which way produced the hit).

The idx index used to index the bias PHT.

The Hash index used to index the exception cache.

An outcome valid signal used to confirm whether the instruction was in fact a branch instruction or not.

As will be appreciated, other than the outcome signal indicating whether the branch was in fact taken or not taken, and the outcome valid signal indicating whether the instruction was in fact a branch instruction, the other pieces of information are those contained within the raw prediction information output from the instruction buffer, and are merely returned over path 616 to the branch prediction logic 610 once the instruction has subsequently been executed by the execution unit. It will be appreciated that the idx index and the Hash index could be regenerated if desired and hence do not need to be pipelined through the execution unit, and returned to the prefetch unit over path 616.

The process performed by the branch prediction logic 610 upon receipt of the branch outcome information will now be described with reference to FIG. 8. At step 500, it is determined whether the outcome of the instruction was valid, i.e. whether the outcome valid signal has been set to "true" to indicate that the instruction was a branch instruction. If the outcome valid signal is set to "false" indicating that the instruction was not in fact a branch instruction, the process proceeds directly to step 590 where the process finishes. However, assuming that the outcome valid signal is set to true, the process proceeds to step 510, where the history register 30 is updated. As will be appreciated from the earlier description of FIG. 3, this update is a function of the existing history data in the shift register and the outcome signal indicating whether the branch was taken or not taken. As mentioned earlier, in an alternative embodiment, the history register is updated speculatively based on the predicted outcome of each branch instruction, and in such embodiments all that is required at step 510 is to confirm the speculative update assuming the prediction was correct. In the event of misprediction, then corrective action would be required to correct the history data.

The process then proceeds to step 520, where it is determined whether an exception cache hit took place at the time the prediction was made, this being determined from the exception cache hit signal returned over path 616. If an exception cache hit did occur, the process branches to step 530, where the exception cache is updated. To perform this process, the branch prediction logic 610 will use the hash index (and the way information in the event that the cache is a set associative cache) to identify the relevant entry in the exception cache, and then will use the outcome information to update the two-bit counter within that entry. It will be appreciated that in some implementations it may be appropriate to check at this stage that the TAG portion of the entry to be updated corresponds with the TAG portion of that entry at the time the prediction was made, i.e. to confirm that the entry has not been overwritten with a new entry. However, in a typical implementation, a new entry would only be allocated (i.e. an existing entry would only get overwritten) in the event of a mispredict event, and in such an event the pipeline would typically be flushed and hence no other branches would be present in the pipeline, thus removing the need for such a check to be performed.

After the exception cache has been updated, the process proceeds to step 540, where it is determined whether the prediction provided by the exception cache was correct. This is determined by comparing the actual outcome information with the prediction generated from the exception cache, referred to in FIG. 8 as "EC Pred". If it is determined that the prediction generated by the exception cache was correct, then the process proceeds to step 550, where it is determined whether the prediction signal generated by the bias PHT was also correct. This is determined by comparing the actual outcome information with the prediction information originally generated by the bias PHT (refer to in FIG. 8 as "PHT Pred") and returned over path 616 as part of the branch outcome information. If this prediction was not correct, then no further action is required, since the exception cache had correctly identified an exception to the first bias value generated by the bias PHT 210.

However, if the prediction by the bias PHT was also determined to be correct at step 550, then the process branches to step 580, where the bias PHT is updated. This update is performed using the idx index to index the relevant entry in the PHT, and then to update that entry using the outcome information.

Figure 8:
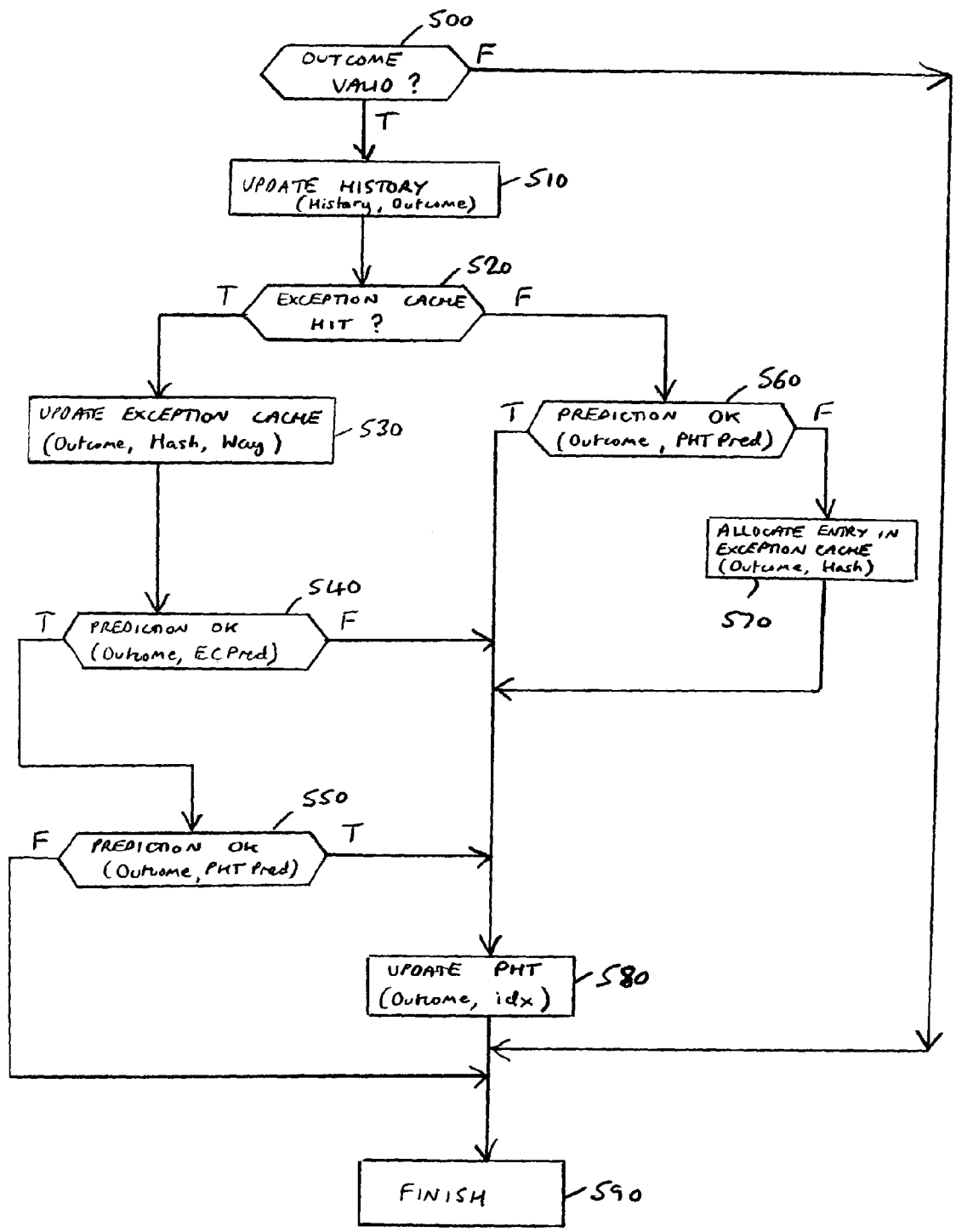
FIG. 8 is a flow diagram illustrating the process performed in embodiments of the present invention to update the history register, bias PHT, and exception cache.

Referring to FIG. 8, it will also be seen that if at step 540, it had been determined that the prediction performed by the exception cache was wrong, then the process would have proceeded directly to step 580 to cause the bias PHT to be updated. Further, if at step 520 it had been determined that there was no hit in the exception cache, and that accordingly the prediction performed had been based on the first bias value output by the bias PHT, then the process proceeds to step 560 where it is determined whether the prediction performed by the bias PHT was correct. If it was, then the process again proceeds to step 580 to cause the bias PHT to be updated, whereas if the prediction was determined to be incorrect, an entry allocation process is performed for the exception cache at step 570. This allocation process may be arranged to always allocate an entry in the exception cache if step 570 is performed, i.e. irrespective of whether the first bias value output by the bias PHT and used in the prediction was a strong or a weak value. Alternatively, the allocation process may be arranged to only allocate an entry in the exception cache if the first bias value was a strong value. In this embodiment, if the first bias value was a weak value, no entry will be allocated in the exception cache, and instead only the first bias value will be updated when the process subsequently proceeds to step 580.

Assuming an entry is to be allocated at step 570, then to perform such entry allocation, the hash index is used to identify the appropriate entry in the exception cache and the entry identified by the hash is then overwritten with the outcome information. In addition, the relevant TAG information corresponding to the second address portion of the branch instruction's address is written in the TAG portion of the entry.

In the event that the cache is a set associative cache, then predetermined allocation techniques will be used to determine in which way of the cache to allocate the particular entry, and hence for example the least recently used entry may be overwritten with the new entry, or a round-robin, random, or other allocation approach may be used. After the new entry has been allocated in the exception cache at step 570, the process then proceeds to step 580 where the bias PHT is updated. Thereafter, the process finishes at step 590.

It will be appreciated by those skilled in the art that whilst the steps described with reference to FIG. 8 have been shown as occurring sequentially, certain of these steps may in practice be performed in parallel if desired.

It has been found that embodiments of the present invention, which employ a single exception cache, rather than the separate Taken cache and Not Taken cache of the YAGS prior art scheme, provide significantly improved flexibility, particularly in implementations where the resources available for the provision of prediction logic are limited, for example in mobile phones, PDAs, etc. Furthermore, for a particular available area, the single cache can be provided with more entries than would otherwise be available if two separate caches were used and this enables a finer granularity of the hash index to be used, thereby reducing the likelihood that two different branch instructions with the same prediction behaviour but with different TAG portions will be identified by the same hash index. As discussed earlier, this reduces the instance of a type of aliasing which would otherwise result in "thrashing" of an entry within the cache, where the entry would be continually being updated to reflect one branch instruction or the other. Furthermore, it has surprisingly been found that the use of such a single cache as opposed to the two separate caches envisaged by the YAGS technique, does not produce any significant increase in a type of destructive aliasing that the YAGS scheme was aiming to reduce. As described earlier, this particular type of aliasing is where two different branch instructions are identified using the same hash index, but have different prediction behaviour. Any slight increase in this type of destructive aliasing is outweighed by the benefits realised in reducing the earlier described type of "thrashing" aliasing, and in providing the increased flexibility for storage of exceptional behaviour.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. Branch prediction apparatus for use in an instruction prefetch unit in a data processor for generating a branch bias providing a prediction as to whether execution of a branch instruction will result in a branch being taken or not taken, the branch prediction apparatus comprising:
   a first branch bias storage operable to store for each of a plurality of first address portions a corresponding first branch bias value, the first branch bias storage being operable upon receipt of a first address portion of the branch instruction's address to output the corresponding first branch bias value from the first branch bias storage;
   a history storage operable to store history data identifying an outcome for a number of preceding branch instructions;
   a single second branch bias storage having a number of entries, each entry being operable to store a replacement branch bias value and a TAG value indicative of an instance in which the replacement branch bias value should be used as the generated branch bias in preference to the first branch bias value, all replacement branch bias values stored in said branch prediction apparatus being stored in said single second branch bias storage;
   index generation logic operable to generate an index identifying a corresponding entry in the single second branch bias storage, the index being derived from the history data;
   the single second branch bias storage being operable upon receipt of the index to cause the content of the corresponding entry to be output from the single second branch bias storage; and
   selection logic operable to select as the branch bias generated by the branch prediction logic the first branch bias value, unless the TAG value output from the single second branch bias storage corresponds to a comparison TAG value derived from a second address portion of the branch instruction's address, in which event, the selection logic is operable, regardless of the first branch bias value, to select as the branch bias generated by the branch prediction logic the replacement branch bias value output from the single second branch bias storage.

2. Branch prediction apparatus as claimed in claim 1, wherein said index generation logic is operable to generate the index from a logical combination of the history data and the branch instruction's address.

3. Branch prediction apparatus as claimed in claim 1, wherein the single second branch bias storage is a set associative storage, wherein the index identifies multiple corresponding entries in the single second branch bias storage, the selection logic being operable to determine whether any of the TAG values output from the corresponding entries correspond to the comparison TAG value, and in the event of such correspondence with the TAG value of one of said corresponding entries, to select the replacement branch bias value for that one corresponding entry as the branch bias generated by the branch prediction logic.

4. Branch prediction apparatus as claimed in claim 3, wherein the selection logic further comprises a priority encoder operable, in the event that the selection logic determines correspondence with the TAG value from more than one of said corresponding entries, to perform a predetermined prioritisation routine to determine which of those corresponding entries' replacement branch bias value is to be selected as the branch bias generated by the branch prediction logic.

5. Branch prediction apparatus as claimed in claim 1, further comprising update logic operable to update the history data in the history storage to take account of whether execution of the branch instruction results in a branch being taken or not taken.

6. Branch prediction apparatus as claimed in claim 1, further comprising update logic operable, following subsequent execution of the branch instruction, to update within the first branch bias storage the first branch bias value associated with the first address portion of the branch instruction so as to take account of whether the execution of the branch instruction resulted in a branch being taken or not taken, unless one of said replacement branch bias values was used as the generated branch bias, that replacement branch bias value correctly predicted the branch, and the first branch bias value would have incorrectly predicted the branch, in which event no update of the first branch bias value is performed.

7. Branch prediction apparatus as claimed in claim 1, further comprising update logic operable, following subsequent execution of the branch instruction, and if one of said replacement branch bias values was used as the generated branch bias, to update that replacement branch bias value within the corresponding entry of the single second branch bias storage so as to take account of whether the execution of the branch instruction resulted in a branch being taken or not taken.

8. Branch prediction apparatus as claimed in claim 1, wherein the first branch bias storage is a table.

9. Branch prediction apparatus as claimed in claim 1, wherein the single second branch bias storage is a single cache.

10. A data processing apparatus comprising:
    an execution unit operable to execute a sequence of instructions; and
    a prefetch unit operable to prefetch instructions from a memory for passing to the execution unit;
    the prefetch unit including branch prediction logic operable to generate a branch bias providing a prediction as to whether execution of a branch instruction by the execution unit will result in a branch being taken or not taken;
    the branch prediction logic comprising:
    a first branch bias storage operable to store for each of a plurality of first address portions a corresponding first branch bias value, the first branch bias storage being operable upon receipt of a first address portion of the branch instruction's address to output the corresponding first branch bias value from the first branch bias storage;

a history storage operable to store history data identifying an outcome for a number of preceding branch instructions;

a single second branch bias storage having a number of entries, each entry being operable to store a replacement branch bias value and a TAG value indicative of an instance in which the replacement branch bias value should be used as the generated branch bias in preference to the first branch bias value, all replacement branch bias values stored in said branch prediction apparatus being stored in said single second branch bias storage;

index generation logic operable to generate an index identifying a corresponding entry in the single second branch bias storage, the index being derived from the history data;

the single second branch bias storage being operable upon receipt of the index to cause the content of the corresponding entry to be output from the single second branch bias storage; and selection logic operable to select as the branch bias generated by the branch prediction logic the first branch bias value, unless the TAG value output from the single second branch bias storage corresponds to a comparison TAG value derived from a second address portion of the branch instruction's address, in which event, the selection logic is operable, regardless of the first branch bias value, to select as the branch bias generated by the branch prediction logic the replacement branch bias value output from the single second branch bias storage.

11. A method of generating within a data processing apparatus a branch bias providing a prediction as to whether execution of a branch instruction will result in a branch being taken or not taken, the method comprising the steps of:

referencing a first branch bias storage using a first address portion of the branch instruction's address, the first branch bias storage being operable to store for each of a plurality of first address portions a corresponding first branch bias value, and being responsive to said referencing to output the first branch bias value corresponding to the first address portion of the branch instruction's address;

storing history data identifying an outcome for a number of preceding branch instructions;

generating an index identifying a corresponding entry in a single second branch bias storage, the index being derived from the history data, the single second branch bias storage having a number of entries, each entry being operable to store a replacement branch bias value and a TAG value indicative of an instance in which the replacement branch bias value should be used as the generated branch bias in preference to the first branch bias value, all replacement branch bias values available when performing the method of generating a branch bias being stored in said single second branch bias storage;

referencing the single second branch bias storage using the index to cause the content of the corresponding entry to be output from the single second branch bias storage; and selecting as the generated branch bias the first branch bias value, unless the TAG value output from the single second branch bias storage corresponds to a comparison TAG value derived from a second address portion of the branch instruction's address, in which event, regardless of the first branch bias value, selecting as the generated branch bias the replacement branch bias value output from the single second branch bias storage.

12. A method as claimed in claim 11, wherein the index is generated from a logical combination of the history data and the branch instruction's address.

13. A method as claimed in claim 11, wherein the single second branch bias storage is a set associative storage, wherein the index identifies multiple corresponding entries in the single second branch bias storage, the selecting step further comprising the steps of:

determining whether any of the TAG values output from the corresponding entries correspond to the comparison TAG value; and in the event of such correspondence with the TAG value of one of said corresponding entries, selecting the replacement branch bias value for that one corresponding entry as the generated branch bias.

14. A method as claimed in claim 13, wherein said determining step further comprises the step of:

in the event that correspondence with the TAG value from more than one of said corresponding entries is determined, performing a predetermined prioritisation routine to determine which of those corresponding entries' replacement branch bias value is to be selected as the generated branch bias.

15. A method as claimed in claim 11, further comprising the step of:

updating the history data in the history storage to take account of whether execution of the branch instruction results in a branch being taken or not taken.

16. A method as claimed in claim 11, further comprising the step of:

following subsequent execution of the branch instruction, updating within the first branch bias storage the first branch bias value associated with the first address portion of the branch instruction so as to take account of whether the execution of the branch instruction resulted in a branch being taken or not taken, unless one of said replacement branch bias values was used as the generated branch bias, that replacement branch bias value correctly predicted the branch, and the first branch bias value would have incorrectly predicted the branch, in which event no update of the first branch bias value is performed.

17. A method as claimed in claim 11, further comprising the step of:

following subsequent execution of the branch instruction, and if one of said replacement branch bias values was used as the generated branch bias, updating that replacement branch bias value within the corresponding entry of the single second branch bias storage so as to take account of whether the execution of the branch instruction resulted in a branch being taken or not taken.

18. A method as claimed in claim 11, wherein the first branch bias storage is a table.

19. A method as claimed in claim 11, wherein the single second branch bias storage is a single cache.

* * * * *